April 23, 1968     C. BERGER ET AL     3,379,570

BATTERY CONTAINING A SINTERED ALUMINOSILICATE SEPARATOR

Filed Oct. 21, 1965

CARL BERGER
FRANK C. ARRANCE
INVENTORS

BY Max Golden

ATTORNEY

United States Patent Office 3,379,570
Patented Apr. 23, 1968

3,379,570
BATTERY CONTAINING A SINTERED
ALUMINOSILICATE SEPARATOR
Carl Berger, Santa Ana, and Frank C. Arrance, Costa
Mesa, Calif., assignors, by mesne assignments, to Mc-
Donnell Douglas Corporation, Santa Monica, Calif., a
corporation of Maryland
Continuation-in-part of application Ser. No. 378,858,
June 29, 1964. This application Oct. 21, 1965, Ser.
No. 499,294
12 Claims. (Cl. 136—6)

This application is a continuation-in-part of our copending application Ser. No. 378,858 filed June 29, 1964, and now abandoned.

This invention relates to batteries, particularly high energy density batteries, and is especially concerned with the provision of improved inorganic membranes or separators for use in batteries, and to improved battery construction embodying efficient inorganic separators having internal structural characteristics permitting transfer of electrolyte ions, such as hydroxyl ions, through the separator but preventing transfer of electrode ions such as zinc and silver ions through the separator.

Batteries are an important source of energy storage for power generation in air-borne systems. An important type of battery particularly suited for such applications are the high energy density alkaline electrolyte cells using such electrode combinations as silver-zinc, silver-cadmium and nickel-cadmium. High energy density batteries are generally battery systems which have a substantially higher energy per unit of weight than conventional, e.g., lead storage batteries. Thus, high energy density batteries can develop, e.g., 100 to 140 watt hours of energy per pound. In addition to important air-borne applications, such high energy density batteries have many other applications such as in portable tools and appliances, television, radio and record players, engine starting, portable X-ray units and the like. However, batteries in use at the present time have not given sufficiently long life, nor have they been able to operate at the extremes of high and low temperatures.

In high energy density batteries such as silver-zinc, nickel-cadmium and silver-cadmium, the separator performs the function of retaining electrolyte, e.g., potassium hydroxide, separating the electrodes, and preventing migration of electrode ions or growth of dendritic crystals of electrode ions which short circuit the battery. It has been known to employ organic separators in such batteries, but these have several disadvantages. Thus, such organic separators are not chemically stable, especially at temperatures above 50° C., they tend to swell excessively at elevated temperatures, and most organics are not readily wetted by caustic solutions. Further, organics are not inert to silver oxide in caustic solutions, and organic materials are generally soft and pliable and are subject to puncture by dendrite growth.

Improved inorganic separators particularly suited for use in high energy density batteries are described in our above copending application. Certain of such inorganic separators preferably in the form of sintered ceramic separators, when assembled in a battery of this type, e.g., a silver-zinc high energy density battery, have resulted in substantially improved battery life at both ambient temperature and elevated temperature, that is, a battery capable of operating efficiently over a large number of discharge-charge cycles, and such batteries are also operable at high temperatures, e.g., of the order of 100° C. and above. For such purpose, it is necessary that such sintered ceramic separators have a suitable porosity. However, it has now been found that for producing highly efficient inorganic separators of this type it is necessary that the inorganic separator materials have an internal structure possessing certain important characteristics, and which permits the free passage of electrolyte ions such as hydroxyl ions, while the electrode ions such as the silver and zinc ions are prevented from passing through such pores.

Hence, although porous inorganic separators having the required overall porosity have generally proven to be superior to organic separators, for example, it has been found that some inorganic separator materials having the requisite porosity still do not possess the proper internal structure for provision of high energy density batteries such as silver-zinc batteries, which have the most desirable operating life, for example, batteries which operate efficiently for more than 1,500 discharge-charge cycles at the elevated temperatures of operation of 100° C. and above. The reasons for the inadequacy of certain of these inorganic separators to achieve these results, although having the requisite overall porosity, is that such inorganic separator materials when formed into a membrane or separator are either too dense or too coarse in internal structure, that is, the pores or passageways in the membrane are too small to permit passage of electrolyte ions or too large to prevent passage of electrode ions and/or that although such materials have a proper pore size, the internal structure is such that the pores are not properly oriented to permit free passage of electrolyte ions from one surface of the membrane to the opposite surface thereof. In addition, batteries incorporating such inorganic membranes have higher internal resistance than is desired for efficient battery operation in order to provide higher voltages and current densities at the above noted higher temperatures of operation.

It has now been found that certain inorganic materials having an internal structure containing very fine interconnected channels of suitable size or diameter, e.g., in the form of tubes, slots, and the like, as hereinafter described, when suitably formed into battery separators such as by compressing, and preferably also sintering such inorganic materials, provide a separator in which such channels are oriented for interconnection through the entire thickness of the separator from one surface to the other thereof, and which when assembled in a high energy density battery performs in a highly superior manner with respect particularly to increased battery life at 25° C. and especially at elevated temperatures of the order of 100° C. and above, as compared to other materials which do not possess this microstructure. Inorganic materials which particularly exemplify these microstructure characteristics are certain of the aluminosilicates. These inorganic materials have a structure in the form of a multiplicity of discrete portions which may be in the form of particles or granules, and when such materials are formed into separators, e.g., by compressing and bonding such portions, preferably employing suitable fluxes, plasticizing agents, and the like, as described hereinafter, and preferably sintering to form a rigid membrane of proper strength, the resulting membrane or separator has a structure in which said discrete portions are juxtaposed into position closely adjacent each other, providing a multiplicity of interconnected microchannels forming free Angstrom-size passageways. The interconnection of these microchannels may be directly between a channel in one granule to a channel in another granule. It may also be between a channel in one granule and an internal void or pore, then through a channel in a second granule and so on, so that through such a sequence of interconnections between channels and pores, or channels and channels, or pores and pores, a continuous passageway is provided from one surface of the separator to the other surface. Such interconnected microchannels have a diameter such as to permit free transfer of electrolyte ions through the separator from one surface thereof to the opposite surface, but preventing transfer of electrode ions therethrough.

It has been found that the necessary control of the pore size of the separator so as to permit free passage of electrolyte, e.g., $OH^-$ ions through the separator while at the same time preventing transfer of electrode ions such as $Ag^+$ ions, cannot be accomplished by conventional grain sizing techniques or by simply sintering materials such as aluminum oxide. If the pore sizes are reduced by higher sintering temperatures or by other means, the electrical resistance of the separator becomes excessive. Thus, separators formed from dense inorganic materials such as aluminum oxide which do not possess the small micropores or molecular passages as noted above, when employed in a high energy density battery, result in substantially reduced battery life due to migration of silver ions through the large pores of the separator. On the other hand, battery separators made from aluminosilicate formulations, and which may contain clays and other materials as described hereinafter and possessing such molecular channels of the proper diameter and orientation, when employed in a high energy density battery have resulted in battery life in excess of 2,200 discharge-charge cycles at 100° C., and more than 2,500 such cycles at 25° C., and at a high voltage discharge plateau of the order of about 1.5 volts as compared to the much shorter battery life and lower voltage plateau for a battery employing an aluminum oxide separator, even though the aluminosilicate and aluminum oxide separators have approximately the same overall porosity, e.g., of the order of about 10 to 30%.

It is a feature of the inorganic separators according to the invention that although such separators can be formed into thin, strong, rigid membranes, satisfactory pore size as well as porosity can be provided in such separators. Maximum overall porosity of such membranes should be about 50%, and minimum porosity about 5%, and hence having a porosity ranging from about 5% to about 50%. Generally, such overall porosity of the inorganic separator of the invention can range from about 8% to about 50%, preferably from about 10% to about 25%, as measured by water absorption according to the expression:

$$\frac{\text{Weight after water saturation} - \text{dry weight}}{\text{dry weight}} \times 100$$

The inorganic separators according to the invention are quite thin, and can have a thickness, e.g., in the range of about .005 to about 0.050 inch.

If the porosity of the separators is greater than about 50%, the strength of the separators is reduced dangerously to a point where the separator is easily broken or shattered, especially during assembly of the battery, and is incapable of properly supporting the electrodes and is generally too porous to prevent electrode ion passage, and if the porosity is below about 5%, the effectiveness of the battery is materially and undesirably reduced due to the substantially reduced amount of electrolyte which can be retained by the separator, thereby preventing required diffusion of electrolyte ions.

Of particular significance, according to the invention and in conjunction with the above noted overall porosity, the interconnected microfissures or microchannels in the membrane should have a diameter ranging from about 1 to about 200 Angstrom units, preferably from about 5 to about 100 Angstrom units in size. Such a pore diameter is sufficient to permit passage of the smaller electrolyte ions such as hydroxyl ions, but is of insufficient size to permit passage of the larger electrode ions or colloids such as, for example, the silver ion or colloid. In addition, such microchannels through the interior of the inorganic material or inorganic separator must be interconnected throughout the separator as pointed out above, and such channels must be open to both surfaces of the separator membrane. This is necessary in order to provide complete communication through the membrane from one surface thereof to the opposite surface. If a sufficient number of microchannels are not so interconected, even if they are of the proper size, this will not afford free passage of the electrolyte ions through the separator from one surface to the other surface.

The invention will be further described in relation to the accompanying drawing wherein.

Figure 1:
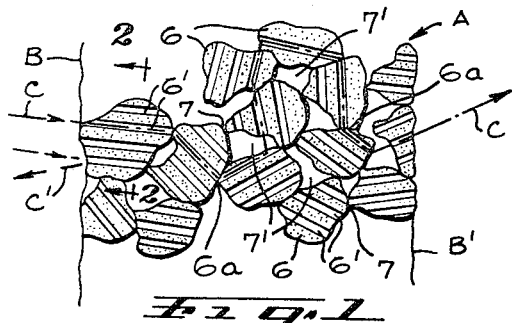
FIG. 1 is a schematic representation showing the structure of an inorganic separator according to the invention.

The illustrations of the drawing are exaggerated for purposes of greater clarity.

Figure 2:
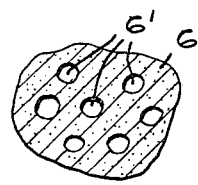
FIG. 2 is a sectional detail taken on line 2—2 of FIG. 1, illustrating the structure of the individual granules.

Referring to FIGS. 1 and 2 of the drawing, illustrating the structure of one type of inorganic separator material for producing an inorganic separator according to the invention, A represents a highly enlarged photomicrographic type cross section of a preferred form of inorganic separator material such as the specific aluminosilicate mineral known as montmorillonite, and composed of a multiplicity of discrete particles or granules 6. In the sintered membrane these particles are bonded or cemented together at areas or points indicated at 7 in the drawing. Such bonding can be accomplished by mixing the mortmorillonite with a suitable fluxing agent or clay as will be described more fully below. The particles 6 are randomly distributed and said particles have a large number of tubular channels 6' therein, such microchannels being of a size noted above, e.g., about 5 to about 100 Angstrom units in diameter, and such microchannels extend through the individual particles from one surface thereof to the other. The microchannels 6' in different particles can be in the same or in different planes. However, it will be seen that the open ends of adjacent channels 6' of certain adjacent particles can communicate with each other either directly, e.g., as illustrated at 6a, or indirectly via pores or voids 7' between granules 6.

Hence, a continuous path is provided through the series of microchannels 6' in such respective adjacent particles or granules 6 from one side of the inorganic separator indicated at B to the other side of the separator indicated at B'. Thus, electrolyte ions, such as a hydroxyl ion, are permitted to pass freely into certain of the tubular channels 6' of the particles 6 at the surface B of the membrane and to pass continuously through certain of the interconnecting microchannels 6' of the adjacent particles to and out of the opposite surface B' of the separator, as indicated, for example, by the path shown in phantom lines in FIG. 1, and further designated C. On the other hand, electrode ions or colloids such as silver ions or colloids impinging upon the individual particles 6 adjacent one surface B of the electrode are unable to pass into the microchannels 6' because of the larger diameter of the silver ions or colloids, and hence are forced back from the separator surface as indicated by the path C' shown in dotted lines in FIG. 1. The voids between the particles, represented by numeral 7' as well as the tubular microchannels 6' are filled with electrolyte such as KOH.

Figure 3:
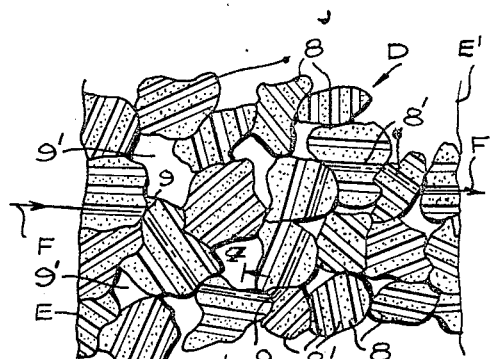
FIG. 3 is a schematic representation of the internal structure of another illustrative type of inorganic membrane according to the invention.

Referring to FIG. 3, there is shown a somewhat different structure D of inorganic separator material according to the invention, the particles or granules 8 of such material being in the form of a plurality of thin plates indicated at 8a. An inorganic material formed of such a plate-like structure is exemplified by the aluminosilicate mineral kaolinite, and the forming of such material into a separator by compaction, and sintering if desired, orients certain of the plates 8a in close juxtaposition to each other, but spaced from each other, and providing a multiplicity of channels or slots 8' between adjacent plates. The ends of certain adjacent channels 8' between adjacent plates 8a are in communication either directly, e.g., as illustrated at 9, or indirectly via pores or voids 9' between granules 8. Thus, a continuous path of flow is formed through such microchannels or slots 8' in the respective adjacent slots from one surface E of the separator to the opposite surface E' thereof. Hence, similarly to the mechanism for the structure of FIG. 1, electrolyte ions are provided with a continuous path indicated at F through a series of interconnected microchannels or slots 8' from a surface E of the separator to the opposite surface E' thereof, whereas the electrode ions such as the larger silver ion or colloid having a diameter larger than the diameter of the microchannels 8' are prevented from entering such microchannels and passing through the separator, as indicated above with respect to FIG. 1. The channels 8' and also the voids 9' between adjacent plates are filled with the electrolyte solution such as potassium hydroxide.

As previously noted, the inorganic materials having the above noted porosity characteristics for producing the inorganic separators of the invention are preferably aluminosilicates. The preferred forms of aluminosilicates for purposes of the invention are the alkali metal and alkaline earth metal aluminosilicates. Examples of aluminosilicates which can be employed include aluminosilicates, sodium and potassium aluminosilicates, and magnesium, calcium, barium and strontium aluminosilicates. These materials can be used separately, but usually mixtures of these aluminosilicates are used, e.g., complex mixtures of both the alkali metal and alkaline earth metal aluminosilicates. It has been found that while many aluminosilicates possess the microstructure described above of the inorganic separators, according to the invention, some aluminosilicates do not possess such microstructure. Typical specific aluminosilicate minerals or clays which do possess such microstructure and hence can be employed for producing the improved inorganic separators of the invention include kaolin, kaolinite, montmorillonite including bentonite, hectorite, mica, serrite, antigonite, and the like. The montmorillonite group of clay minerals includes montmorillonites, $Al_2O_3 \cdot 4SiO_2 \cdot H_2O + Aq$; deibeidellite, $$Al_2O_3 \cdot 3SiO_2$$

$nH_2O$; saponite, $2MgO \cdot 3SiO_2$, $nH_2O$; nontronite, $$(Al,Fe)O_3 \cdot 3SiO_2$$

$nH_2O$; and Sauconite, $2ZnO \cdot 3SiO_2$, $nH_2O$. These materials have a micropore size of 10 to 20 Angstroms. Other similar minerals having the desired characteristics include illite, the hydromica group having the general formula $(OH)_4Ky(Al_4 \cdot Fe_4 \cdot Mg_4 \cdot Mg_6) Si_{8-y}, Al_yO_{20}$ with $y$ varying from 1 to 1.5. Also included is attapulgite which is fibrous and has the formula $$(OH_2)_4(OH)_2Mg_5Si_8O_{20} \cdot 4H_2O$$

Among the suitable kaolinites are included the minerals dickite, nacrite, anauxite, halloysite and livesite. The above minerals are disclosed in Dana's Manual of Mineralogy, seventeenth edition, 1963, John Wiley, New York.

Certain of the above aluminosilicate minerals have an internal structure formed of discrete particles having the tubular microchannels extending therethrough as illustrated at 6 and 6' in FIGS. 1 and 2. Illustrative of aluminosilicates of this structural nature are montmorillonites such as bentonite.

Figure 4:
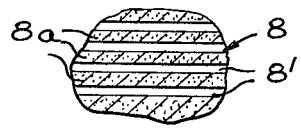
FIG. 4 is a sectional detail taken on line 4—4 of FIG. 3, illustrating the structure of the individual granules of this material.

Certain of the inorganic materials or aluminosilicates are of plate-like structure having microchannels in the form of slots between the plates, extending through the portions or particles of aluminosilicate illustrated at 8a and 8' in FIGS. 3 and 4, as exemplified by the hydromica, illite.

Those aluminosilicates which do not possess the required microporous structure and hence are not suitable for producing the improved inorganic separators of the invention include pyrophyllite, mullite, topaz and kyanite.

The inorganic separators of the invention are prepared by formulating and processing the inorganic separator material, and compressing the formulated material. The compressed membranes can function as inorganic separators according to the invention, but preferably the compressed membranes are sintered, generally at temperatures of the order of about 300 to about 1,800° C., to produce a rigid membrane of sufficient strength for use in a battery. In the sintering procedure, it is important to build up the strength of the separator without substantially sacrificing any of its desirable microporous characteristics. Hence, usually, the inorganic material of microporous structure according to the invention is compounded with additional materials including clays, plasticizers and other materials to provide a separator having the desired microstructure and also the desired strength. Thus, for example, an aluminosilicate, e.g., kaolin, can be fluxed with materials such as magnesium carbonate, calcium carbonate or feldspar (an alkaline aluminosilicate) to provide alkali or alkaline earth metal fluxing constituents to produce good bonding of the discrete portions of the kaolin to provide a strong membrane having the desired microporous aluminosilicate structure. Also, plasticizers such as clays and organic materials, including ball clays, calcined clays and colloidal clays, and also wax and synthetic organics such as carbowax can be employed to provide a workable mix and to produce a porous separator having dimensional stability and having the desired microporous structure. The amount of plasticizer or flux employed with the inorganic material of porous microstructures described above should not be sufficiently great as to materially decrease or impair the microporous structural characteristics of the inorganic material.

The term "sintered ceramic" as employed herein is intended to denote the sintered aluminosilicates of which the invention separators are composed.

The separators or membranes thus formed, are particularly adapted for use in batteries to provide long battery life where extremely strong membranes are required to maintain electrode ion separation between the electrodes of the battery, and wherein operating temperatures may exceed the temperature range of 25 to 150° C. Also, the sintered aluminosilicates employed as battery separators according to the invention have less internal resistance than other sintered materials formed from certain insoluble metal oxides, such as aluminum oxide. Batteries embodying separators according to the invention, and including KOH as electrolyte, have the additional advantage that such batteries and components can be sterilized at temperatures of the order of about 145° C. for extended time periods without deterioration of the separator, which is of importance in certain applications. Moreover, the present invention has the distinct advantage of allowing such membranes to be stored in an inert form for indefinite periods of time without change and to be employed as needed in batteries, particularly high energy density batteries.

Figure 5:
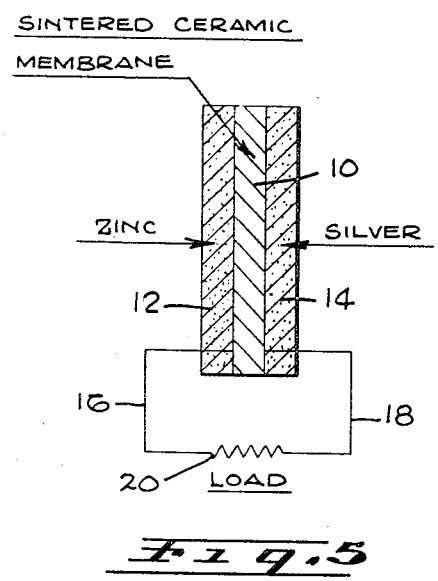
FIG. 5 is a representation of a battery assembly including electrodes assembled in conjunction with a separator according to the invention.

Referring to FIG. 5 of the drawing, a sintered ceramic membrane according to the invention as illustrated in FIGS. 1 and 2, and represented by numeral 10, formed for example by the compression and sintering of a suitable microporous inorganic material as described above, is flame-sprayed on opposite sides or surfaces with a zinc electrode indicated at 12, and with a silver electrode indicated at 14. Alternatively, such electrodes can be pressed against opposite sides of the separator. The voids and microchannels of the separator 10 are filled with an alkaline electrolyte. Wires 16 and 18 connect the electrodes 12 and 14 respectively to a load 20.

During discharge of the batteries illustrated in FIGS. 1 and 2, as is well known, the zinc converts to zinc oxide and the silver oxide to silver, and during charging of such batteries the silver is oxidized to silver oxide and the zinc oxide is reduced to zinc. Because of these reversible reactions, the terms "silver" and "zinc," the terms "silver" and "cadmium" and the terms "nickel" and "cadmium," referring to the metals forming the respective electrodes of such battery systems, are intended to denote either the respective metals themselves or the corresponding oxides thereof.

It will be noted in the schematic illustration of FIG. 5 that the separator 10 aids in supporting the metal electrodes 12 and 14, which are flame-sprayed on or pressed against opposite surfaces of the separator.

Example 1

A mixture of sodium and potassium aluminosilicates and calcium, magnesium and barium aluminosilicates formed by fluxing kaolin with alkaline materials including calcium, barium and magnesium carbonates, is prepared for pressing by ball milling for 16–30 hours with water or an organic liquid such as acetone or alcohol. After ball milling, the slurry is oven dried at 120° C. to 150° C; and the dried material is then granulated.

The granulated material is pressed in steel or carbide lined dies at pressures of about 5,000 to 10,000 p.s.i. The pressed separators are then sintered by heating to about 1,000° C. for about 8 hours. The sintered ceramic membrane thus formed has a thickness of about 0.030 inch, a porosity of about 12%, and has a microstructure of the type illustrated in FIGS. 1 and 2, containing micropores ranging from about 5 to about 100 Angstroms in diameter.

Silver electrode material is prepared using equal parts of silver and silver oxide. These materials are mixed in a high speed vibrating mixer and pressed at 5 tons to about 15 tons total load into 2-inch diameter discs about 0.100 inch thick. The pressed discs are placed between flat, smooth, viterous ceramic plates and sintered about 3 hours at a temperature of about 350° C. After cooling to room temperature, the sintered discs are cut to size and spotwelded to a fine nickel screen.

The silver electrodes are prepared for use by electrolytic oxidation or charging at room temperature in 30% KOH. After forming, the electrode is removed from the charging stand and assembled in a battery as described below.

Zinc electrodes are prepared by mixing about 90 parts zinc oxide, 7 parts HgO, and 3 parts polyvinyl alcohol in a high-speed vibratory mixer. After mixing, a weighed amount of this material is placed in an electrode compartment in contact with a fine nickel screen, mixed with a small amount of 30% KOH and electrolyzed.

Figure 6:
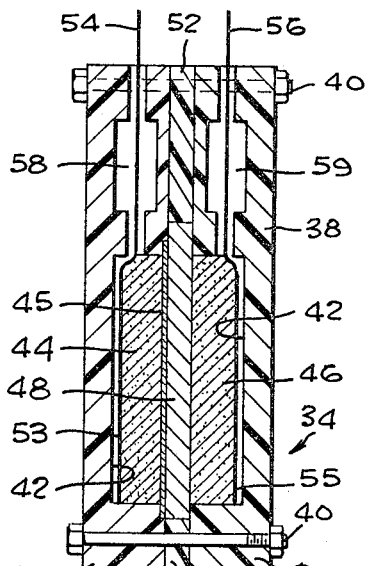
FIG. 6 shows the manner of assembly of a separator according to the invention, and electrodes to form a battery according to the invention.

The separator and electrodes described above are assembled to form a battery as shown in FIG. 6, employing a plastic case 34 formed of two symmetrical, e.g., Teflon, half portions 36 and 38 which are bolted together as indicated at 40. Compartments 36 and 38 of the case have recesses 42 formed therein to receive the zinc and silver electrodes 44 and 46, respectively, prepared as described above. An inorganic aluminosilicate separator 48 prepared as described above is disposed centrally between the case portions 36 and 38 so that the electrodes 44 and 46 are pressed against opposite surfaces of such separator, with a potassium titanate paper 45 inserted between the zinc electrode 44 and separator 48 to aid in supporting the zinc electrode, according to the invention described in our copending application Ser. No. 378,859, filed June 29, 1964. Teflon spacers 50 and 52 are provided about the periphery of separator 48, to form a leak-prof seal. Nickel screens 53 and 55 are embedded in electrodes 44 and 46 adjacent to the bottom of the compartment recesses 42, and silver terminal wires 54 and 56 are connected respectively to the screens 53 and 55, and are brought through the plastic electrode sections at the top of the assembly as shown. Small electrolyte reservoirs 58 and 59 are provided in the upper portion of the respective electrode compartments 36 and 38.

A battery of the type described above and illustrated in FIG. 6 and containing the separator 48 having the microporous structural characteristics of the invention has been found capable of operating for from about 1800 to about 2000 cycles at 25° C. and at 100° C. using one-half hour discharge and one-half hour charge cycles, at a voltage discharge plateau of about 1.5 volts.

Example 2

Results similar to those obtained in Example 1 are obtained employing as the inorganic separator material an aluminosilicate in the form of the hydromica, illite, having the plate-like structure and microchannels in the form of slots, as illustrated in FIGS. 3 and 4 of the drawing.

Example 3

A separator is prepared from a 95% aluminum oxide mixture, which does not contain a structure having microchannels therein, and 5% of alkaline fluxes comprising $Na_2O$, $K_2O$ and $Li_2O$.

Following compaction and sintering of the above mixture to form a membrane, such membrane is employed as a separator in a silver-zinc battery of the type described in Example 1 and illustrated in FIG. 6. This battery fails after three discharge-charge cycles at room temperature, even though the porosity of such separator is of the order of about 10%.

Example 4

A composition containing 88% aluminum oxide, 10% kaolinite (an aluminosilicate), and 2% of alkaline fluxing materials including calcium carbonate and magnesium carbonate, is sintered and the resulting membranes formed after sintering have a porosity of 12.4%.

A membrane of this type is incorporated in a silver-zinc battery as described in Example 1 and illustrated in FIG. 6, and is observed to operate for 296 discharge-charge cycles at 100° C.

It is noted that the separator of this example contains a small amount (about 10%) of kaolinite which has the proper microstructure according to the invention, that is, microchannels having a diameter ranging from about 1 to about 200 Angstrom units. It is noted that although this separator has limited cycle life because only a small amount of the material of which the separator is formed has the desired microstructure, it performed better than the separator of Example 3, which contained no material having the proper microstructure, but was substantially inferior to the separator of Example 1 which has a high concentration of inorganic material of the required microstructure.

Example 5

A composition is prepared consisting of a mixture of about 50% of fibrous talc (a magnesium silicate), 35% bentonite (an aluminosilicate) having the tubular microstructure of the required size according to the invention as illustrated in FIGS. 1 and 2, and 15% feldspar (a potassium aluminosilicate). This mixture is sintered and forms a membrane having a porosity of about 15%.

The resulting membrane is assembled in a silver-zinc battery of the type described in Example 1 and shown in FIG. 6 of the drawing. This battery operates for 1,050 discharge-charge cycles at 100° C.

It is seen from this example that results are obtained employing the above noted talc-bentonite mixture which are far superior to those obtained in Examples 3 and 4, but inferior to the results obtained in Example 1. This is due to the fact that although 35% of the separator composition is composed of the preferred bentonite containing the microporous structure, 50% of the separator composition is composed of talc which does not have the desired microstructure of the aluminosilicates employed according to the invention.

Example 6

Membranes or separators are prepared from a mixture of 50% kaolinite (an aluminosilicate) and 50% calcined kaolinite. After sintering, such separators exhibit a porosity of about 8.9%.

Separators of this type when assembled in a silver-zinc battery of the type described in Example 1, and illustrated in FIG. 6 operate for a large number of discharge-charge cycles at 25° C. and 100° C., comparable to the results obtained in Example 1. However, the separators of this example are physically weak compared to those of Example 1, since the kaolinite separator composition of this example contained no bonding clays or fluxes.

Example 7

Separators are prepared from a mixture of 90% pyrophyllite (an aluminosilicate) which does not have the microporous characteristics of other suitable aluminosilicates according to the invention, and about 10% of a mixture of plasticizer comprising kaolin and bentonite and fluxes comprising CaO, MgO and BaO. After sintering, these separators exhibit a porosity of about 8.0%.

Separators of this type are assembled in a silver-zinc battery of the type described in Example 1 and illustrated in FIG. 6. The battery operates for only four discharge-charge cycles and fails.

This example clearly indicates that aluminosilicates such as pyrophyllite, which do not have the microstructure of aluminosilicates such as bentonite or kaolin, are not suitable for preparation of the improved separators of the invention.

Example 8

A battery substantially similar to that of Example 1 and shown in FIG. 6 is assembled, except that the electrodes are silver and cadmium.

Such a battery also can be cycled on the order of about 1,800 to 2,000 discharge-charge cycles at 25° C. and 100° C. without loss of effective capacity.

Example 9

A battery substantially similar to that of Example 1 and shown in FIG. 6 is assembled except that the electrodes are nickel and cadmium.

Such a battery can also be cycled for from about 1,800 to about 2,000 discharge-charge cycles at 25° C. and 100° C.

Example 10

A battery substantially similar to that of Example 1 and shown in FIG. 6 is fabricated, except that in place of the sintered ceramic separator of Example 1, a porous Teflon separator of substantially the same thickness is employed.

The Teflon is not readily wetted by the KOH electrolyte, causing the separator to have high resistance, and as a result the efficiency and capacity of the battery are substantially reduced. Such a battery runs for only about 25 discharge-charge cycles at 25° C. and 100° C. before battery failure occurs.

From the foregoing, it is seen that the invention provides high energy density batteries embodying certain inorganic, preferably sintered, membranes or separators having an internal structure and porosity characteristics which prevent migration of electrode ions or colloids such as silver ions or colloids and zinc ions, through the separator to opposite electrodes while permitting free transfer of electrolyte ions such as hydroxyl ions through the separator. Such inorganic membranes of microporous structure according to the invention permit extended and long operation at normal ambient temperatures as well as at higher temperatures of operation of the order of 100° C. and above, without deterioration of these membranes as compared to prior art, e.g., organic separators, are resistant to oxidation by electrodes, e.g., silver oxide, and are radiation resistant. Batteries incorporating the separators of the invention are capable of being cycled through many discharge-charge cycles up to 2,000 and more such cycles at ambient temperatures of about 25° C. as well as at elevated temperatures of about 100° C. without any substantial loss in capacity. Such separators are of rigid, relatively inflexible structure and are capable of supporting to some degree electrodes placed on opposite sides of the separator in contact therewith.

It will be understood, as indicated by Examples 8 and 9 above, that the inorganic separators of the invention can be employed in combination with any desired electrode system, including silver-zinc, silver-cadmium, nickel-cadmium, and the like.

While we have described particular embodiments of our invention for purposes of illustration, it will be understood that the invention is not to be taken as limited except by the scope of the appended claims.

We claim:

1. A battery including a battery separator, said battery separator comprising porous sintered aluminosilicate having a structure in the form of a multiplicity of discrete particles bonded together, with voids between said particles, said discrete particles having a plurality of microchannels therein, and providing a multiplicity of microchannels at least a portion of which are interconnected, and extend throughout the entire thickness of said separator from one surface of said separator to the opposite surface, said sintered aluminosilicate having a porosity ranging from about 5% to about 50%, said microchannels having a diameter of between about 1 and about 200 Angstrom units, said porosity being determined from the formula:

$$\frac{\text{Weight after water saturation} - \text{dry weight}}{\text{dry weight}} \times 100$$

2. A battery as defined in claim 1, said microchannels being tubular channels extending through said particles.

3. A battery as defined in claim 1, said particles having a plate-like structure, and said microchannels being in the form of slots between said plates and extending through said particles.

4. A battery as defined in claim 1, said aluminosilicate including a fluxing material.

5. A battery as defined in claim 1, the porosity of said sintered aluminosilicate ranging from about 10% to about 25%, said microchannels having a diameter ranging from about 5 to about 100 Angstrom units.

6. A battery as defined in claim 1, said sintered aluminosilicate being fluxed with a mixture of alkali and alkaline earth metal-containing materials.

7. A battery as defined in claim 1, wherein said aluminosilicate is kaolinite.

8. A battery as defined in claim 1, wherein said aluminosilicate is montmorillonite.

9. A battery as defined in claim 1, wherein said aluminosilicate is a hydromica.

10. A battery as defined in claim 1, said battery further comprising zinc and silver electrodes.

11. A battery as defined in claim 1, said battery further comprising nickel and cadmium electrodes.

12. A battery as defined in claim 1, said battery further comprising silver and cadmium electrodes.

References Cited

UNITED STATES PATENTS

| | | | |
|---|---|---|---|
| 3,266,940 | 8/1966 | Caesar | 136—86 |
| 1,200,345 | 10/1916 | Hardy et al. | 136—146 |
| 1,291,253 | 1/1919 | Thatcher | 136—146 |
| 2,181,299 | 11/1939 | Burgess | 136—146 |
| 2,422,045 | 6/1947 | Ruben | 136—154 X |
| 2,428,470 | 10/1947 | Powers | 136—146 X |
| 2,475,538 | 7/1949 | Baird | 136—146 |
| 2,655,552 | 10/1953 | Fuller et al. | 136—146 X |
| 3,223,556 | 12/1965 | Cohn et al. | 136—146 X |

OTHER REFERENCES

Jakobi, "Alkaline Secondary Cells," Encyclopedia of Chemical Technology, volume, 3, second edition (1963), page 168.

ALLEN B. CURTIS, *Primary Examiner.*

WINSTON A. DOUGLAS, *Examiner.*

D. L. WALTON, *Assistant Examiner.*